(12) United States Patent
Hendricks et al.

(10) Patent No.: US 6,682,587 B2
(45) Date of Patent: Jan. 27, 2004

(54) MELTABLE INK COMPOSITION

(75) Inventors: Danny Hendrik maria Hendricks, Venlo (NL); Marcus Petrus Leonardus Huinck, Herten (NL); Frederik Leonardus Everardus Suilen, Swalmen (NL)

(73) Assignee: Oce-Technologies B.V., Venlo (NL)

( * ) Notice: Subject to any disclaimer, the term of this patent is extended or adjusted under 35 U.S.C. 154(b) by 0 days.

(21) Appl. No.: 10/038,829

(22) Filed: Jan. 8, 2002

(65) Prior Publication Data
US 2002/0124771 A1 Sep. 12, 2002

(30) Foreign Application Priority Data
Jan. 8, 2001 (NL) .............................................. 1017049

(51) Int. Cl.[7] .............................................. C09D 11/00
(52) U.S. Cl. ................. 106/31.29; 106/31.61; 106/31.58; 106/31.86
(58) Field of Search .......................... 106/31.29, 31.61, 106/31.58, 31.86

(56) References Cited

U.S. PATENT DOCUMENTS

| | | | |
|---|---|---|---|
| 4,738,889 A | * | 4/1988 | Suzuki et al. ............... 428/195 |
| 4,851,045 A | | 7/1989 | Taniguchi |
| 4,923,783 A | | 5/1990 | Kobayashi et al. |
| 4,931,095 A | | 6/1990 | Nowak et al. |
| 6,471,758 B1 | * | 10/2002 | Kelderman et al. ...... 106/31.29 |

FOREIGN PATENT DOCUMENTS

| | | |
|---|---|---|
| EP | 0856 565 A1 | 8/1998 |
| EP | 0 978 548 A1 | 2/2000 |
| EP | 1 067 157 A1 | 1/2001 |
| JP | 2076786 | 3/1990 |

* cited by examiner

*Primary Examiner*—Mark L. Bell
*Assistant Examiner*—Veronica F. Faison
(74) *Attorney, Agent, or Firm*—Birch, Stewart, Kolasch & Birch, LLP

(57) ABSTRACT

A meltable ink composition used in a printing apparatus in which ink drops are ejected from ink ducts wherein the ink composition contains a compound with the following formula

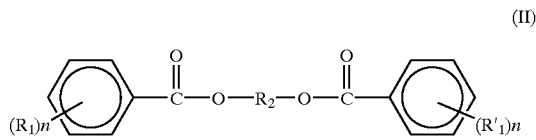

(II)

in which $R_1$ and $R'_1$ are the same or different and are selected from a C1–8 alkyl group or a C1–8 alkoxy group, $R_2$ is a C1–12 linear alkane diyl group or a C5–12 alkane diyl group containing an alicyclic group, and n is 1, 2 or 3.

16 Claims, No Drawings

MELTABLE INK COMPOSITION

BACKGROUND OF THE INVENTION

The present invention relates to a meltable ink composition, for use in printing devices in which ink drops are ejected from ink ducts. Inks of this kind, which are also known as hot melt inks or phase change inks, are solid at room temperature and liquid at elevated temperatures. In a printing device, for example, an ink jet printer, the ink is melted and transferred to substantially closed ink ducts which lead at one end into a nozzle. As a result of a sudden pressure rise in the duct, produced for example by rapidly reducing the volume of the duct or rapidly evaporating some of the ink in the duct, a drop of ink can be ejected from the duct through the nozzle. In this way an image can be built up from individual ink drops on a receiving material. Meltable inks contain a carrier material with a melting point higher than room temperature so that the ink melted in the printing device is practically not subject to evaporation when the printing device is not printing. This prevents the nozzles of the ink ducts from becoming clogged. In addition, inks of this kind have the advantage that they set rapidly on the receiving material, so that the print quality, particularly the edge sharpness, is less dependent on the type of receiving material.

U.S. Pat. No. 4,851,045 discloses oxidized montan waxes which are the reaction product of aliphatic diols and C25–35 fatty acids. These waxes have the disadvantage that their melting temperature is relatively low, so that printed ink images may result in blocking at elevated temperature or bleeding through the paper. In addition, the crystallized waxes are relatively soft, so that printed images may feel "waxy" and be less resistant to mechanical stresses. Finally, the viscosity of these esterified montan waxes is relatively high, so that it is difficult to use them in ink compositions for ink jet printers.

U.S. Pat. No. 4,931,095 discloses benzoates as a component of meltable inks. Compounds of this kind are formed by esterifying benzoic acid, an unsubstituted aromatic acid, with a suitable alcohol. From the patent specification it is known to use polyalcohols, such as pentaerythritrol, sucrose and glycerol for this purpose. These benzoates have the disadvantage that they set amorphously when they cool rapidly from a melted state, particularly when a liquid ink drop is transferred to a relatively cold receiving material. As a result, the solidified ink drops are to some extent tacky at room temperature, particularly when mechanically stressed. By gumming, scratching or rubbing over a printed image, for example, the ink may block. In addition, the compounds may subsequently crystallize after being transferred to a receiving material, so that quality of the image, particularly the visual quality, deteriorates in the course of time.

EP 0 856 565 A1 discloses the toluate and anisylate esters of pentaerythritol as a component of a meltable ink. These compounds differ from the benzoates due to the presence of a substituent on the aromatic benzene ring. As a result, the physical and chemical properties of these compounds differ from those of the benzoates. These toluates and anisolates, however, also have the disadvantage that they solidify amorphously when cooled rapidly. In addition, the compounds have a relatively intensive after-crystallization. They also have the disadvantage that their melting temperature is relatively high, thus making them less suitable as a component for a meltable ink. A higher melting temperature makes much higher demands of the printing device itself.

The toluate and anisylate esters of 2,2'-bisphenol are known from EP 0 978 548 A1. These substances result in inks which exhibit a deterioration in copy quality if the prints are stored for a long time, for example some months. This is probably the result of a slow after-crystallization from an amorphous state.

A specific 1,4-bis-[(substituted)-benzoyloxymethyl]-cyclohexane is known from JP 2076786 as a sensitivity improver for a color developer in a sheet suitable for thermal transfer. This patent does not indicate or suggest that these compounds can also be used in meltable inks suitable for ink jet printers. The latter inks are subject to totally different requirements from inks for thermal transfer. Ink jet printers differ from thermal printers in that the liquid ink in the form of individual ink drops ejected through air over a certain distance, is transferred to a receiving material. As already indicated hereinbefore, the print heads used for this purpose have ink ducts provided with nozzles and means for ejecting one ink drop at a time from a specific nozzle. To achieve this drop formation, the physical properties of the ink, particularly the viscosity and surface tension, must lie within narrow limits. In addition, meltable ink is frequently heated a number of times in an ink jet printer and then cooled again to room temperature before actually being transferred to a receiving material. This places high demands on the thermal stability of the ink. All this makes the development of meltable inks for ink jet printers a particularly complex area.

High-boiling organic solvents for use in a silver halide photographic material are known from U.S. Pat. No. 4,923,783, in accordance with formula I

$$(ArCOO)_n—L \qquad (I)$$

wherein Ar is an aryl group with 6 to 24 carbon atoms, L is a 2-valent to 6-valent alkylene with 2 to 24 carbon atoms possibly containing one or more ether bonds and n is an integer between 2 and 6. Compounds of this kind reduce the reductive bleaching of cyan dyes as a result of damp and heat. This patent contains no suggestion that these substances can be used as a component in a meltable ink.

SUMMARY OF THE INVENTION

An object of the present invention is to provide a meltable ink composition having advantageous properties for use in printing devices in which the ink is ejected in the form of drops from ink ducts. Another object of the present invention is to provide ink compositions which result in printed images having a good and stable print quality. A further object of the present invention is to provide inexpensive ink compositions. To this end, an ink composition has been discovered which contains a compound in accordance with the following formula II (II)

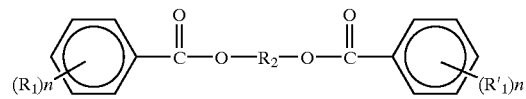

where $R_1$ and $R'_1$ are the same or different and are selected from a C1–8 alkyl group or a C1–8 alkoxy group, $R_2$ is a C1–12 linear alkane diyl or a C5–12 alkane diyl which contains an alicyclic group, and n is 1, 2, or 3. These bis-ester compounds have melting temperatures suitable for forming a meltable ink composition usable in an ink jet printer. The melt viscosity of the compounds is also sufficiently low, typically lower than 20 cP, at the regular jet temperatures. The compounds are also such that they can result in inks sufficiently resistant to mechanical stress. Finally, these compounds are stable in the solidified state, so that the risk of deterioration of the copy quality of printed images is reduced. Compounds of this kind can advantageously be used in meltable ink compositions. In this way the present invention counters the disadvantages of the prior art ink compositions as described above.

Advantageously, $R_1$ and $R'_1$ are selected from a C1–6 alkyl group or a C1–6 alkoxy group. With these compounds it is possible to obtain ink compositions which are less waxy. With ink compositions of this kind, therefore, it is possible to obtain images which are more resistant to mechanical stress such as rubbing, scratching, gumming or folding. More preferably, $R_1$ and $R'_1$ are selected from a C1–4 alkyl group or a C1–4 alkoxy group. These compounds are even less waxy and can thus result in ink compositions for printing images which are even more resistant to mechanical stresses.

In one preferred embodiment, $R_1$ is equal to $R'_1$. In this way, better-defined compounds can be obtained, the properties of which can be more satisfactorily controlled. In this way it is possible to obtain an ink composition which is better adapted to the specific requirements that a specific application imposes for the ink. In addition, a better defined product of this kind can be obtained in a purer form which enables the reliability of use of the ink composition to be increased.

Preferably, $R_1$ and $R'_1$ are a C1–4 alkoxy group. These compounds crystallize more rapidly. Ink compositions provided with such compounds can result in printed images which are resistant to mechanical stresses very soon after actual printing. In this way it is possible to subject printed receiving material to further processing practically immediately, for example in a finishing station in order to make up sets of documents. In addition, these ink compositions have the advantage that they are even more stable.

In one preferred embodiment $R_1$ and $R'_1$ are a C1–2 alkoxy group. Compounds of this kind are simpler and hence less expensive to produce, this being advantageous in terms of the cost of the ink composition. Even more preferable, $R_1$ and $R'_1$ are a methoxy group. Very good ink compositions according to the present invention can be obtained with these compounds.

In one embodiment n is equal to 1. The resulting compounds can easily be obtained in pure form, resulting in a good ink composition.

In a further embodiment, $R_1$ and $R'_1$ are substituted at the para position. It has been found that compounds of this kind can crystallize relatively quickly and are stable in the solidified state. The reason for this is not entirely clear, but is probably due to the symmetry in the molecule, so that it is easier to build up a crystal lattice. Ink compositions which contain such compounds become hard relatively quickly when transferred to a receiving material and are stable in the course of time. A high print quality can be obtained in this way.

In one specific embodiment, $R_2$ is a C2–C6 linear alkane diyl. These compounds have a very favorable melting point and are relatively hard in the crystallized state. With these it is possible to obtain ink compositions which are improved with respect to resistance to mechanical stress.

In a further embodiment, the ink composition contains a compound selected from the group consisting of bis-esters of paramethoxy benzoic acid with 1,3-propane diol and 1,6-hexane diol. With these compounds it is possible to obtain very good ink compositions according to the present invention. In another embodiment, $R_2$ is a C6–C8 alkane diyl containing an alicyclic group. These compounds have a higher melting point so that an ink composition can be obtained which is very resistant to mechanical and thermal stresses.

In a preferred embodiment in which the alicyclic group is substituted so as to have a cis and a trans-conformation (one example of such an $R_2$ group is 1,4-cyclohexane dimethylene), the ink composition contains the trans-conformation of the alkane diyl. This stereoisomer crystallizes more satisfactorily than the cis-conformation so that an ink composition can be obtained with better mechanical properties. In addition, this compound results in ink compositions which are more stable in time, because after-crystallization will occur to a lesser degree.

In yet a further preferred embodiment, the ink composition substantially contains the trans-conformation of the alkane diyl. Inks with further improved properties can be obtained in this way.

Preferably, the ink composition contains 10–99% by weight of compounds according to formula II. It has been found that the formula II compounds are particularly suitable as a carrier material for a meltable ink composition, because in this way it is possible to form ink compositions with an optimal melting temperature and melt viscosity. Also, the ink compositions, after cooling, are very resistant to mechanical stress and are stable over the course of time. It has been found that the compounds according to formula II can advantageously be used in a meltable ink provided with a gelling agent.

In a further embodiment, the ink composition contains 30–99% by weight of one or more formula II compounds. In this way the advantages of this compound can be further utilized so that meltable inks can be obtained with even more favorable properties.

The compounds according to formula II can be used in many ways in meltable inks suitable for use in ink jet printers. For example, they can be used in relatively large quantities as a carrier material in an ink composition and, for example, in smaller quantities as a viscosity regulator, softener, mixture improver, and so on. In addition to a single compound, ink compositions according to the present invention may also make use of mixtures of these compounds. In addition, these compounds can be used in combination with known hot melt ink components, such as waxes, paraffins, resins, softeners, viscosity regulators and so on. The final composition depends on the specific requirements the ink must meet, and this depends on the type of ink jet printer, the required print quality, the type of receiving material, the specific application, and so on.

The present invention will now be explained further with reference to the following examples and tables which are given as examples only and are not limitive of the present invention.

Example 1 shows a number of ink compositions according to the present invention. Comparative Example 2 gives a number of ink compositions containing compounds which are known in the prior art. Example 3 indicates how formula II compounds can be made.

Table 3 gives a number of examples of formula II compounds.

Table 4 shows a number of compounds known from the prior art.

EXAMPLE 1

A number of ink compositions according to the present invention are shown in this example.

TABLE 1

Ink Compositions According To The Present invention

| Ink | Main component, percentage by weight | Tm [° C.] | Tk [° C.] | Solidification time [sec] |
|---|---|---|---|---|
| a | compound 2, 69% | 87 | 20 | 67 |
| b | compound 3, 69% | 112 | 85 | 16 |
| c | compound 4, 69% | 84 | 28 | 40 |
| d | compound 7, 69% | 100 | 27 | 63 |
| e | compound 8, 69% | 87 | 43 | 35 |
| f | compound 10, 69% | 88 | 40 | 41 |

Table 1 shows a number of ink compositions a to f. In this example, each of these inks contains as the main component 69% by weight of a compound i, the numbering referring to Table 3, which contains a number of compounds according to formula II.

For each of these inks, the melting temperature (Tm) was measured with a DSC-7 Perkin-Elmer apparatus using differential scanning calorimetry. For this purpose, each of the compounds was heated from −20° C. to 150° C. with a heating rate of 20° C. per minute. The melting temperature selected is the position of the top of the melting peak (endothermic process). The crystallization temperature (Tk) of the inks is indicated in the fourth column and is also measured by DSC. To this end, each of the inks was melted by heating them to 150° C., whereafter the inks were cooled at a rate of 20° C./min to −20° C. The crystallization temperature selected is the middle of the crystallization peak (exothermic process). The fifth column shows the ink solidification time. This is the time the ink composition requires to become sufficiently hard after the ink has been transferred in the liquid state to a cold substrate. This solidification time was determined as follows: 1 g of each of the ink compositions was transferred to a microscope slide having a temperature of 130° C. As soon as the ink had completely melted, the slide was transferred to a steel plate (having a high heat capacity) at a temperature of 20° C. The time was then determined that the ink required to be sufficiently hard, and in the case of these inks this was equivalent to a practically complete crystallization of the main component.

In addition to 69% of formula II compound, each of these ink compositions a to f contains 29% (percentage by weight) of a binder, in this case Cellolyn 21E (a phthalate ester of Hercules industrial hydroabiethyl alcohol). This binder serves for further improvement of the mechanical properties of the ink compositions. The inks are also provided with 1% viscosity regulator, in this case an aliphatic bis-amide obtained by the reaction of 1,10-decane dicarboxylic acid and 3-methoxy-1-propane amine. Finally, 1% of BASF Neopen Magenta 1378 was added as a dye.

The inks were prepared by transferring the three basic components (compound i, binder Cellolyn 21E and viscosity regulator) in the solid state to a melting vessel. A magnetic agitator was added to this. The components were heated to 135° C. with constant agitation. After the components had completely melted, the mixture was stirred for a few minutes until homogeneous. The dye was then added, and under constant agitation was distributed homogeneously through the mixture. The homogenous melt was then filtered over a heated (135° C.) filter with an absolute mesh width of 3 μm. The hot filtrate was brought to the required dispensing form and cooled until completely solidified.

Using an ink jet printer of the piezo hot melt type, each of these ink compositions was used to print a number of images by melting and heating the ink to a temperature of about 130° C. and then transferring it in the form of individual ink drops to a plain paper receiving material. Each of these images was of excellent quantity and sufficiently resistant to mechanical stresses such as folding, scratching and gumming. The stability of the printed images was good. Even after being stored for a long time under normal ambient conditions, the images exhibited no deterioration in quality.

Ink compositions according to the invention can be provided with various additives, such as amorphous resins, crystalline components, oligo- and polymers, viscosity regulators, anti-oxidants, UV protectors and other anti-deterioration agents. All this depends on the required properties of the ink, and this in turn is dependent on the type of apparatus with which the ink is to be printed, the final use, the users wishes, and so on.

EXAMPLE 2 (COMPARATIVE EXAMPLE)

This example gives a number of ink compositions containing known compounds.

TABLE 2

Ink Compositions Provided With Compounds Known In The Prior Art

| Ink | Main component, percentage by weight | Tm [° C.] | Tk [° C.] | Slidification time [sec] |
|---|---|---|---|---|
| g | compound 14, 69% | 68 | 15 | 101 |
| h | compound 15, 69% | 77 | −7 | 300 |
| i | compound 16, 69% | 52 | <−20 | >500 |
| j | Compound mixture 18, 69% | 109 | <−20 | 205 |

The ink compositions g to j in this comparative example contain as the main component compounds known from the prior art. These and other compounds are shown in Table 4. Just as the ink compositions described in Example 1, the ink compositions in this case also contain 29% Cellolyn 21E as binder, 1% of the aliphatic bis-amide as viscosity regulator, and 1% Neopen Magenta 1378. The ink compositions were also prepared as indicated in Example 1.

The melting temperature, crystallization temperature and solidification time of these inks were measured in the same way as the measurements described under Example 1.

Using an ink jet printer of the piezo hot melt type, a number of images was printed with each of these ink compositions in a manner corresponding to that described under Example 1. It was found that each of the images was not sharp, and the ink compositions provided with compounds 15 and 16 particularly resulted in considerable feathering of the ink in the paper. It also took a relatively long time, more than a few minutes, for the inks according to the above compositions to become sufficiently hard. Until then, blocking occurred when the images were subjected to slight mechanical stress (for example by rubbing thereover). After this the images also remained very sensitive to blocking. This is probably due to the low crystallization temperature of these ink compositions. It makes the corresponding prints unsuitable for further mechanical processing, for example folding or stuffing into envelopes.

EXAMPLE 3

The bis-ester compounds according to formula II can be prepared by reacting the corresponding alkane diyol with the corresponding carboxylic acid or carboxylic acid chloride.

The compounds shown in the Table 3 described below were prepared as follows. A 2-liter capacity 3-neck round-bottom flask was provided with a magnetic agitator, a thermometer, a reflux cooler with inert nitrogen and a 250 ml dropping funnel. A solution of 0.750 mol of the corresponding alkane diyol in 750 ml methylene dichloride was placed in the flask whereafter the solution was provided with 1.650 mol pyridine. The flask was brought into a nitrogen atmosphere whereafter the solution was cooled to about 5° C. by cooling with an external ice/water mixture. 1.575 mol of the corresponding carboxylic acid chloride, which can be prepared by a person skilled in the art in simple manner as known from the prior art, was then added slowly via the dropping funnel with constant agitation. The temperature may not exceed 20° C. in these conditions.

After the acid chloride had been completely added, the contents of the round bottom flask were heated to 40° C., the reaction mixture being refluxed. After 4 hours' reflux, the mixture was cooled to room temperature. After 12 hours the solution was washed twice with 250 ml 1.0 molar hydrochloric acid to remove the pyridine. The solution was then washed twice with 500 ml of an 0.2 molar $NaHCO_3$ solution to neutralize it.

The methylene chloride phase washed in this way was dried by the addition of 20 g of magnesium sulphate and then filtered. The methylene chloride was then evaporated using a vacuum. The remaining crude product was recrystallized from hot ethanol or acetone. The crystals were dried in vacuo for 24 hours at 75° C. The purity was determined by NMR (nuclear magnetic resonance) and the melting point was determined by DSC as indicated under Example 1.

Table 3

Table 3 gives a number of formula II compounds. The structural formula and the melting point is given for each compound. The melting points were determined by differential scanning calorimetry (DSC-7 made by Perkin-Elmer). For this purpose, each of the compounds was heated from −20° C. to 150° C. at a heating rate of 20° C./min. The melting temperature was the position of the top of the melting peak (endothermic process).

The compounds 1 and 2 are the bis-esters of 2-methyl benzoic acid and 1,4-butane diol, and trans-1,4-cyclohexane dimethanol respectively.

The compounds 3, 4 and 5 are the bis-esters of 4-methyl benzoic acid and 1,4-butane diol, and 1,6-hexane diol and 1,12-dodecane diol respectively.

Compound 6 is the bis-esters of 3-methoxy benzoic acid and 1,4-butane diol.

Compounds 7, 8 and 9 are the bis-esters of 4-methoxy benzoic acid and 1,3-propane diol, and 1,6-hexane diol and 1,8-octane diol respectively.

Compound 10 is the bis-ester of 4-n-propoxy benzoic acid and 1,4-butane diol.

Compound 11 is the bis-ester of 3,4-dimethoxy benzoic acid and 1,6-hexane diol.

Compound 12 is the bis-ester of 3,4,5-trimethoxy benzoic acid and 1,2-ethane diol.

Compound 13 finally is the bis-ester of 4-tertbutyl-benzoic acid and 1,4-butane diol.

Table 4

This table gives a number of compounds known from the prior art.

The benzoates 14, 15,16 and 17 are the bis-esters of benzoic acid and 1,2-ethane diol, and 1,4-butane diol, 1,6-hexane diol and trans-1,4-cyclohexane dimethanol respectively.

Compound 18 is a mixture of the trans (70% by weight) and cis (30% by weight) stereoisomers of the bis-ester of benzoic acid and 1,4-cyclohexane dimethanol.

Compound 19 is the bis-ester of a C47 linear fatty acid and trans-1,4-cyclohexane dimethanol.

Compound 20 is the bis-ester of 4-methyl benzoic acid with 2-methyl-1,3-propane diol. Compound 21 is the bis-ester of benzoic acid and 2,2-dimethyl-1,3-propane diol.

Finally, anisolate 22 is the bis-ester of 4-methoxy benzoic acid (anisic acid) and 1,4-benzene dimethanol.

Column 2 gives the melting point of these compounds as determined by differential scanning calorimetry in the manner indicated in Example 1. The third column shows the properties of these compounds in meltable ink compositions provided with the usual binder materials. These properties make these compounds less suitable or even unsuitable for use in a meltable ink composition.

TABLE 3

Formula II Compounds and Their Melting Point

| No | Structural formula | Tm [° C.] |
|---|---|---|
| 1 | 2-CH₃-C₆H₄-C(O)-O-(CH₂)₄-O-C(O)-C₆H₄-2-CH₃ | 69 |
| 2 | 2-CH₃-C₆H₄-C(O)-O-CH₂-(TRANS cyclohexane)-CH₂-O-C(O)-C₆H₄-2-CH₃ | 96 |

TABLE 3-continued

Formula II Compounds and Their Melting Point

| No | Structural formula | Tm [° C.] |
|---|---|---|
| 3 | $CH_3-C_6H_4-C(=O)-O-(CH_2)_4-O-C(=O)-C_6H_4-CH_3$ | 117 |
| 4 | $CH_3-C_6H_4-C(=O)-O-(CH_2)_6-O-C(=O)-C_6H_4-CH_3$ | 90 |
| 5 | $CH_3-C_6H_4-C(=O)-O-(CH_2)_{12}-O-C(=O)-C_6H_4-CH_3$ | 60 |
| 6 | 3-$CH_3O-C_6H_4-C(=O)-O-(CH_2)_4-O-C(=O)-C_6H_4-OCH_3$-3 | 78 |
| 7 | $CH_3O-C_6H_4-C(=O)-O-(CH_2)_3-O-C(=O)-C_6H_4-OCH_3$ | 107 |
| 8 | $CH_3O-C_6H_4-C(=O)-O-(CH_2)_6-O-C(=O)-C_6H_4-OCH_3$ | 95 |
| 9 | $CH_3O-C_6H_4-C(=O)-O-(CH_2)_8-O-C(=O)-C_6H_4-OCH_3$ | 88 |
| 10 | $C_3H_7-O-C_6H_4-C(=O)-O-(CH_2)_4-O-C(=O)-C_6H_4-O-C_3H_7$ | 95 |
| 11 | 3,4-$(CH_3O)_2-C_6H_3-C(=O)-O-(CH_2)_6-O-C(=O)-C_6H_3-(OCH_3)_2$-3,4 | 115 |
| 12 | 3,4,5-$(CH_3O)_3-C_6H_2-C(=O)-O-(CH_2)_2-O-C(=O)-C_6H_2-(OCH_3)_3$-3,4,5 | 114 |
| 13 | 4-$(CH_3)_3C-C_6H_4-C(=O)-O-(CH_2)_4-O-C(=O)-C_6H_4-C(CH_3)_3$-4 | 82 |

TABLE 4

Compounds Known From The Prior Art, Their Melting Point And Properties In An Ink Composition

| No | Structural formula | Tmelt [° C.] | Properties |
|---|---|---|---|
| 14 | Ph-C(O)-O-(CH₂)₂-O-C(O)-Ph | 75 | high vapor tension |
| 15 | Ph-C(O)-O-(CH₂)₄-O-C(O)-Ph | 87 | solidifies very inertly |
| 16 | Ph-C(O)-O-(CH₂)₆-O-C(O)-Ph | 58 | low melting point, amorphous solidification with after-crystallization |
| 17 | Ph-C(O)-O-CH₂-(TRANS cyclohexyl)-CH₂-O-C(O)-Ph | 128 | high melting point |
| 18 | ---(TRANS)---/---(CIS)---70/30 | 113 | too soft after solidification |
| 19 | CH₃(CH₂)₄₅-C(O)-O-CH₂-(TRANS)-CH₂-O-C(O)-(CH₂)₄₅CH₃ | 94 | waxy, too soft |
| 20 | CH₃-Ph-C(O)-O-CH₂-CH(CH₃)-CH₂-O-C(O)-Ph-CH₃ | 62 | amorphous solidification and slow after-crystallization |
| 21 | Ph-C(O)-O-CH₂-C(CH₃)₂-CH₂-O-C(O)-Ph | 52 | amorphous solidification and slow after-crystallization |
| 22 | CH₃O-Ph-C(O)-O-CH₂-Ph-CH₂-O-C(O)-Ph-O-CH₃ | 147 | melting point too high |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A meltable ink composition for use in a printing apparatus in which ink drops are ejected from ink ducts, said ink composition containing a compound of the formula

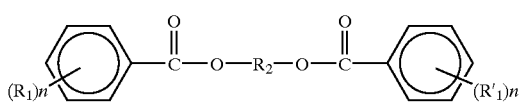

(II)

wherein $R_1$ and $R'_1$ are the same or different and are selected from a C1–8 alkyl group or a C1–8 alkoxy group, $R_2$ is a C1–12 linear alkane diyl or a C5–12 alkane diyl containing an alicyclic group, and n is 1, 2 or 3.

2. The ink composition according to claim 1, wherein $R_1$ and $R'_1$ are selected from a C1–6 alkyl group or a C1–6 alkoxy group.

3. The ink composition according to claim 2, wherein $R_1$ and $R'_1$ are selected from a C1–4 alkyl group or a C1–4 alkoxy group.

4. The ink composition according to claim 1, wherein $R_1$ is equal to $R'_1$.

5. The ink composition according to claim 4, wherein $R_1$ and $R'_1$ are a C1–4 alkoxy group.

6. The ink composition according to claim 5, wherein $R_1$ and $R'_1$ are a C1–2 alkoxy group.

7. The ink composition according to claim 6, wherein $R_1$ and $R'_1$ are a methoxy group.

8. The ink composition according to claim 1, wherein n is 1.

9. The ink composition according to claim 8, wherein $R_1$ and $R'_1$ are para-substituted.

10. The ink composition according to claim 1, wherein $R_2$ is a C2–C6 linear alkane diyl.

11. The ink composition according to claim 10, wherein the compound is selected from the group consisting of bis-esters of paramethoxy benzoic acid with 1,3-propane diol and 1,6-hexane diol respectively.

12. The ink composition according to claim 1, wherein $R_2$ is a C6–C8 alkane diyl containing an alicyclic group.

13. The ink composition according to claim 12, wherein the compound has a cis- and trans-conformation and the ink composition contains the trans-conformation of the alkane diyl.

14. The ink composition according to claim 13, wherein the ink composition substantially contains the trans-conformation.

15. The ink composition according to claim 1, wherein the ink composition contains 10 to 99% by weight of at least one formula II compound.

16. The ink composition according to claim 15, wherein the ink composition contains 30 to 99% by weight of at least one formula II compound.

* * * * *